Feb. 16, 1960     R. E. FOX     2,925,244
GATE VALVE
Filed May 21, 1957
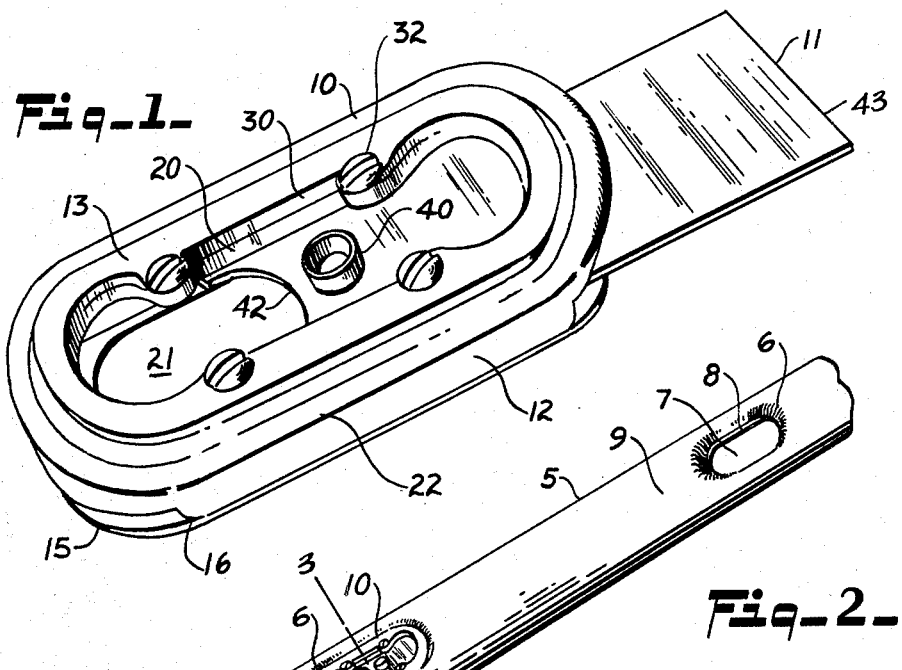
Fig-1-
Fig-2-
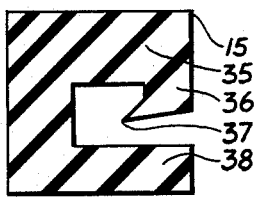
Fig-5-
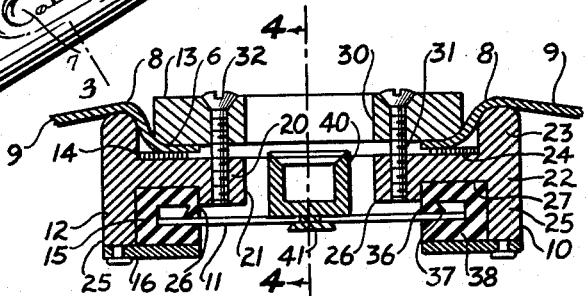
Fig-3-
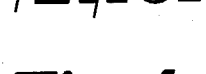
Fig-4-
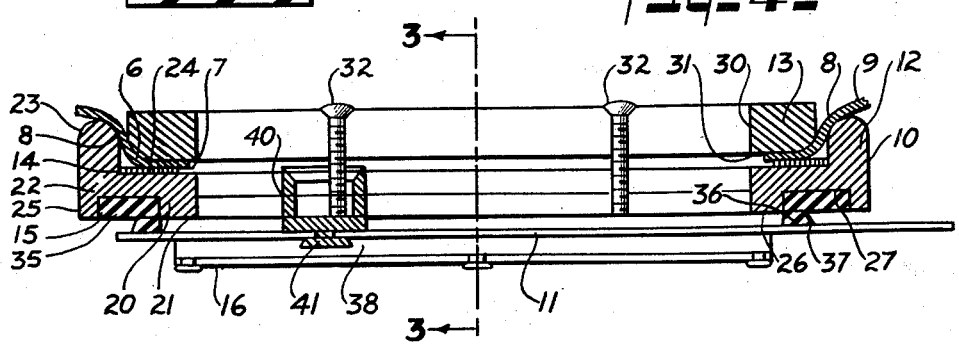

United States Patent Office 2,925,244
Patented Feb. 16, 1960

2,925,244

GATE VALVE

Robert E. Fox, Redwood City, Calif., assignor to W. R. Ames Company, San Francisco, Calif., a corporation of California Application May 21, 1957, Serial No. 660,582

6 Claims. (Cl. 251—145)

This invention relates to an improved gate valve for irrigation pipe and particularly to a flow-control valve with a slide gate adapted to control an outlet opening in a side wall of a pipe. It is also applicable to other types of equipment.

The present invention is adapted particularly for high-pressure uses and represents an improvement over the gate valve shown in the patent issued to Roger M. Sherman No. 2,771,904 on November 27, 1956. The valve disclosed in that patent is fully satisfactory for pressures up to about 40 to 50 p.s.i. and is widely used for low-pressure applications. However, above about 45 to 50 p.s.i. the water pressure tends to deform the thin-walled pipe and often causes permanent irregularities in the pipe-wall opening that make the valve unworkable. Such high pressures are often met when the gate valves are closed and the pipe is being used in a sprinkling system. Heretofore, such dual use was not practical and the same pipe could not be used both for low-pressure irrigation and high-pressure sprinkling systems.

The present invention solves the problem of providing a gate valve which can be installed either in the factory or in the field and which will hold pressures up to 100 p.s.i. without any significant deformation of the pipe opening.

Thus, one object of the present invention is to provide an inexpensive, easily-manufactured gate valve that can withstand high hydraulic pressures.

Another object of the invention is to provide a gate valve that enables dual use of the same pipe for low-pressure irrigation systems and high-pressure springling systems.

Another object of the invention is to provide a high-pressure gate valve that can be readily installed in the field on assembled pipe sections without necessitating an extensive shutdown and without a requirement for special tools.

Another object of the invention is to provide a gate valve that may be inserted into a perforation in a pipe and which will not be blown out or caused to leak by very high liquid pressures inside the pipe nor will it permit the wall itself to deform in significant amounts.

Other objects and advantages of the invention will appear from the following description.

In the drawings:

Fig. 1 is a perspective view of a flow-control valve embodying the principles of this invention, shown in a partially open position.

Fig. 2 is a perspective view on a reduced scale of a pipe section showing a flow-control valve mounted in one of two openings on the side wall of the pipe. The other opening is shown prior to insertion of a second valve of the same type.

Fig. 3 is a view in widthwise section of the valve shown on a larger scale than in Fig. 2 and taken on the line 3—3 in Figs. 2 and 4.

Fig. 4 is a cross-sectional view of the valve as mounted in the pipe, taken along the line 4—4 of Fig. 3.

Fig. 5 is a longitudinal section of the valve gasket before it is assembled in the gate valve.

A sheet-metal irrigation pipe 5 may be provided intermediate its ends with one or more longitudinal, flat portions 6 along one or both sides of the pipe. Each flattened portion 6 is perforated to provide an opening 7, preferably, though not necessarily, with semicircular ends. A generally radially extending portion 8 preferably joins the portion 6 to a generally cylindrical portion 9 constituting the major portion of the pipe wall.

A gate valve 10 embodying the principles of this invention may be designed to fit into each opening 7 to give flow control therethrough, the amount of flow being determined by the position of a valve slide 11. The valve 10, considered broadly, includes several major elements, an inner frame member 12, an outer frame member 13, a sealing member 14, a gasket 15, a gasket retainer 16, and the sliding gate member or slide 11.

The inner frame member 12 comprises the supporting body for the valve 10 and fits inside the pipe 5 against the flattened portion 6 and the generally radially extending portion 8. The inner frame 12 is preferably shaped to provide an inner rim 20 bounding a flow control opening 21 through which the water may pass, as regulated by the position of the slide 11. Preferably, this inner rim 20 has parallel sides and semicircular ends, as shown in Fig. 1. The inner frame 12 also has an outer rim 22 concentric with and of the same general shape as the inner rim 20 but spaced away from it by the width of the frame member 12. The outer rim 22 has an upper flange 23 which extends upwardly from a generally flat upper surface 24 and a lower, depending flange 25 which extends down below a generally flat, lower surface 26. The lower surface 26 is also provided, adjacent the lower flange 25, with a flat-bottomed groove 27, preferably rectangular in cross section.

The generally flat upper surface 24 of the inner frame 12 is adapted to engage the inner, or lower, surface of the flat pipe portion 6, while the upper flange 23 engages the inner wall of the radially extending portion 8 and some of the cylindrical portion 9, thereby continuously supporting the oval rim where elements 8 and 9 meet. Watertight sealing is provided by the sealing member 14, which may be a flat oblong ring of neoprene or similar material located in the corner formed by the meeting of the flat upper surface 24 and the upper flange 23. The member 14 engages both the inner frame 12 and the pipe 5 and is preferably somewhat compressed between them so as to provide a tight seal.

The outer frame 13 is shaped to provide an inner rim 30 substantially of the same configuration and dimensions as the inner rim 20 of the inner frame 12, and a lower, generally flat surface 31 adapted to engage the outer wall of the flattened section 6 and the generally radially extending portion 8 of the pipe 5. Suitable means, such as a plurality of screws or rivets 32 (in this instance four screws 32 are shown), are provided to tightly clamp the outer frame 13 to the inner frame 12 in a manner that will hold them both tightly against opposite sides of the pipe wall portions 6 and 8 with the sealing member 14 compressed. For factory installation, rivets are very suitable; for installation in the field, screws will generally be preferable, and by using screws the valve 10 may be removed and replaced more easily.

Thus the combination of the inner frame 12 and outer frame 13 provides a strong anchor for the gate valve 10 and makes it possible to accommodate high pressures without distorting the flattened portion 6. This is very important, for earlier gate valves this portion was distorted when very high pressures were encountered, as when a farmer sought to use the same pipe in a high-pressure sprinkling system. In the present invention the heavy inner and outer frames 12 and 13 clamp the portion 6 between them and so protect it from the water while the sealing member 14 prevents leakage.

The gasket 15 is installed in the groove 27 and is held in place by a pair of gasket retainer strips 16 which may be either screwed, riveted, or otherwise secured to the lower flange 25 of the inner frame 12. The gasket 15 has an upper locking portion 35 with a shape similar to that of the inner and outer frames 12, 13 and adapted to fit securely into the groove 27. The inner rim of the portion 35 has a depending sealing member 36, preferably provided with a thin lip 37 whose initial undeformed position is shown in Fig. 5. A pair of lower supporting portions 38 depend from the outer rim of the portion 35 along the two parallel sides of the gasket 15, their upper surfaces being spaced from the lip 37 to provide a channel in which the slide 11 moves, their lower surfaces being engaged by the strips 16. As shown in Fig. 3, insertion of the slide 11 forces the lip 37 up, assuring good sealing contact. There is no supporting portion 38 at the semicircular ends of the gasket 15, in order to allow the slide 11 to move in its intended manner. Sealing contact against the end portions of the lip 37 is assured by the adjacent parts of the supporting portion 38, the strips 16, and the pressure within the pipe 5.

The slide or gate 11, which is slidably mounted in the gasket 15, may be provided with a handle or button 40 which is grasped when opening and closing the gate 11. This button 40 may be secured to the slide 11 by a screw or rivet 41 (as shown) or by any other suitable means. The button 40 also acts as a stop to limit movement of the slide 11 beyond the gasket 15. The end 42 of the slide 11 may be rounded convexly as shown to provide a better shaped opening than if a rectangular end, like the other end 43, were to be used.

The installation and assembly of valve gate 10 is as follows. The pipe 5 is first prepared for receiving the valve gate 10 by forming the opening 7 and flattened portion 6 of the proper dimensions. Meanwhile, some of the parts are assembled into the inner frame 12; the gasket 15 is inserted in the groove 27, the strips 16 are secured in place, the gate 11 is slid into the gasket 15, the button 40 is secured to the slide 11, and the sealing member 14 is placed at the juncture of the upper flange 23 and flat portion 24. The inner frame 12, with these associated parts, is then placed inside the pipe 5, either from one end of the pipe 5 or through the opening 7, by sliding the gate 11 to its open position so that the fingers may be inserted to hold the inner frame 12 up against the flat portions 6 of the pipe. Then, holding the inner frame 12 in place in this manner, with the upper flange 23 bearing against the generally radially extending pipe portion 8, and the generally flat upper surface 24 bearing against flat portions 6, the outer frame 13 is placed over the flattened portion 6 and is secured to the inner frame member 12 by rivets or screws 32. Generally, rivets are preferred when gate valve 10 is being installed in the plant, while screws are necessary for field installation.

With the gate valve 10 in place, the operation is quite simple. When used for flood irrigation purposes, pipes 5 are laid perpendicular to many furrows where the flow of water is desired, and the farmer walks down the row of pipe, adjusting each sliding gate member 11 to the desired position. The gate valve 10 can be provided with graduations for accurate control of the amount of water flow. When the pipe 5 is used for sprinkling, the gate valves 10 are closed, and they hold the higher pressure without deformation of themselves or of the pipe.

In some cases gates 11 may be put on both sides of the pipe 5, for example, in wide furrowed fields where water is to be directed in both directions.

It will be noted that upon the completed installation of gate valve 10 in the pipe 5, no portion of the valve 10 extends above the natural circumference of the pipe 5, and thus there is no danger of any parts breaking off or being damaged in storing the pipe or in transporting it from the manufacturer to the user or in the user's transporting it from one field to another.

While previous gate valves of this general type were usable with low pressures in the pipe, as 45 to 50 p.s.i., the present invention can be used where pressures go up to 100 p.s.i., and over, so that it can be used in sprinkling systems as a satisfactory part of the conduit pipes.

With former valves the excessive water pressure on the gate valve caused the thin-walled pipe to bend, which meant leakage or that the sliding gate 11 would not slide any longer. To fix this, the valve had to be removed, and the pipe hammered back into shape. But this weakened the pipe walls even more, and even less pressure was required to prevent the slide from moving. However, the new gate valve has eliminated this problem. The rigid inner frame member 12 and the rigid outer frame 13 work together to stiffen the flattened portion 6. The frame members 12, 13 are thicker than the pipe walls, and distribute the pressure evenly over the whole semicircular surface.

The new gate valve 10 has eliminated the user's worry about pressure distortion, and the resultant constant repair problems. No longer does the user have to watch the pressure gauge for fear of gate valve failures.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A flow control valve for insertion in a pipe wall having a depressed, flattened portion surrounding a perforation and surrounded by a rim portion of said wall, said valve including in combination: inner and outer rigid frame members adapted to abut the opposite sides of said depressed, flattened wall portion, said inner frame member having a rigid portion abutting and supporting said rim portion; means to clamp said inner and outer frame members together in a leak-tight fit about said flattened wall portion; a gasket member corresponding approximately to the shape of the opening and provided with parallel longitudinally extending grooves; a slide member supported slidably in said gasket, movable longitudinally along said grooves; and means for holding said gasket to said inner frame member in a leak-tight fit thereagainst.

2. A gate valve for insertion at an opening in a pipe wall, comprising in combination, inner and outer rigid frame members for engagement with and rigid reinforcement of the opposite sides of the pipe wall around the opening and providing continuous rigid support therefor, said frame members defining a valve passage therethrough; means holding said inner and outer frame members together so that they engage said wall in a leak-tight fit; a gasket secured in a leak-tight fit to one of said frame members around said valve passage; and a slide member supported by said gasket along its edges in a leak-tight fit at the edges and mounted for relative longitudinal movement with respect thereto so as to open and close said valve passage.

3. In a flow control valve adapted for insertion in the wall of a pipe in which said pipe wall is provided with a depressed, flattened portion surrounding a perforation and surrounded by a rim portion having the normal circumference of said pipe wall, the combination of inner and outer rigid frame members that respectively engage the inner and outer faces of said depressed, flattened portion to provide continuous support for said flattened portion, said inner frame member having an upstanding continuous flange abutting and providing continuous support for said rim; means to clamp said inner and outer frame members together in a leak-tight fit about said flattened wall portion; a ring-like gasket member corresponding approximately to the shape of the periphery of the perforation, provided with parallel slots extending longitudinally therethrough; a slide member movable longitudinally along said slots with a leak-tight fit between said gasket and side marginal portions of said slide member; and means to hold said gasket to said inner frame member in a leak-tight fit.

4. In a high-pressure flow control valve insertable in the wall of a pipe in which said pipe wall is provided with a depressed, oval flattened portion surrounded by an oval rim and surrounding an opening, the combination therewith of inner and outer rigid frame members adapted to lie on respectively the inner and outer faces of said depressed, flattened wall portion within the depression and to provide a continuous support for the oval, flattened wall portion, said inner frame member having an upstanding flange continuously abutting and supporting said rim; said inner and outer frame members being clamped together by means of screws with a sealing member between to prevent leakage; a gasket member corresponding approximately to the shape of the opening and provided with parallel slots extending longitudinally therethrough, a slide member movable longitudinally along said slots, and having marginal edges sealed by said gasket though movable with respect thereto and means to hold said gasket leak-tight with respect to said inner frame member.

5. A flow-control valve for insertion in a perforation in the wall of a pipe having a depressed, flattened inner rim portion surrounding said perforation and joined by an outwardly extending wall portion to the major portion of the pipe wall at a rounded rim portion, said valve comprising a rigid inner frame having an inner rim defining a flow opening, an upper surface, a lower surface, a groove in its lower surface and a flange on its upper surface supporting said rounded rim portion; a resilient sealing member seated on said upper surface to seal against said flattened rim portion; a rigid outer frame with an inner rim defining a flow opening substantially the same size as that of the inner frame, to fit against the outer surface of said pipe wall inner rim portion and secured to said inner frame so as to seal both of them against said pipe; an elastomeric gasket seated in said groove and having a pair of parallel slots extending lengthwise thereof; gasket retainer means fitting snugly on the lower surface of the gasket and secured to said inner frame to hold said gasket thereto in a leak-tight fit; and a rigid gate member with marginal edges slidable in said slots to control the flow through said valve and sealed during and after sliding therealong by said gasket.

6. A gate valve adapted for insertion in a perforation in the wall of a pipe, a depressed, flattened inner rim portion of the pipe wall surrounding said perforation and joined by a generally radially extending wall portion to the major portion of the pipe wall, said gate valve including in combination: a rigid metal inner frame with an inner rim defining an opening, an outer rim with an upper flange engaging a continuous portion of said major portion of said pipe wall, and a lower flange, a generally flat upper surface extending in to said rim from the inner side of said upper flange and supporting said continuous portion of said pipe wall, a lower surface extending in to said rim from said lower flange and having a groove therein adjacent said lower flange; a resilient elastomeric sealing member seated on said upper surface to seal against the rim portion of said pipe wall; a rigid metal outer frame with an inner rim defining a flow opening the same size as that of the inner frame, adapted to fit against the outer surface of the rim portion of said pipe wall; means for clamping said inner and outer frames together about said pipe inner rim portion, tightening said sealing member so as to provide a leak-tight fit; an elastomeric gasket seated in said groove, generally rectangular in cross-section and having a pair of parallel slots extending in from each inner rim thereof, between a lower flat base and an upper lip; gasket retainer means fitting snugly on the lower surface of the gasket beneath said flat base and secured to said lower flange holding said gasket thereto in a leak-tight fit; and a rigid gate member with marginal side portions slidable in said slot to control the flow through said valve and sealed against leakage between itself and said gasket.

References Cited in the file of this patent

UNITED STATES PATENTS

| | | |
|---|---|---|
| 2,499,738 | Folsom | Mar. 7, 1950 |
| 2,771,904 | Sherman et al. | Nov. 27, 1956 |